United States Patent
Wang

(10) Patent No.: US 10,015,105 B2
(45) Date of Patent: Jul. 3, 2018

(54) TRAFFIC CONTROL METHOD, DEVICE AND STORAGE MEDIUM

(71) Applicants: HISENSE CO., LTD., Qingdao, Shandong (CN); HISENSE USA CORPORATION, Suwanee, GA (US); HISENSE INTERNATIONAL CO., LTD., Qingdao, Shandong (CN)

(72) Inventor: Xiaoming Wang, Qingdao, Shandong (CN)

(73) Assignees: HISENSE CO., LTD., Qingdao, Shandong (CN); HISENSE USA CORPORATION, Suwanee, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 339 days.

(21) Appl. No.: 14/529,605

(22) Filed: Oct. 31, 2014

(65) Prior Publication Data
US 2016/0028635 A1    Jan. 28, 2016

(30) Foreign Application Priority Data
Jul. 24, 2014    (CN) .......................... 2014 1 0356804

(51) Int. Cl.
*H04L 12/54* (2013.01)
*H04L 12/863* (2013.01)
*H04L 12/865* (2013.01)

(52) U.S. Cl.
CPC ........ *H04L 47/623* (2013.01); *H04L 47/6215* (2013.01); *H04L 47/6275* (2013.01)

(58) Field of Classification Search
CPC .............. H04L 47/623; H04L 47/6215; H04L 47/6275
See application file for complete search history.

(56) References Cited

U.S. PATENT DOCUMENTS

| | | | |
|---|---|---|---|
| 2002/0089989 A1* | 7/2002 | Christensen | ........... H04L 29/06 370/395.42 |
| 2003/0063562 A1* | 4/2003 | Sarkinen | ............. H04L 12/5693 370/230 |
| 2007/0206568 A1* | 9/2007 | Silver | ..................... H04L 12/66 370/352 |

(Continued)

FOREIGN PATENT DOCUMENTS

| | | |
|---|---|---|
| CN | 102118320 | 7/2011 |
| CN | 103618681 | 3/2014 |
| CN | 102035748 | 7/2014 |

OTHER PUBLICATIONS

Chen, Xianqing; Design and Implementation for Application Layer Protocol Filtering System; Apr. 20, 2010.

*Primary Examiner* — Charles C Jiang
*Assistant Examiner* — Ryan Kavleski
(74) *Attorney, Agent, or Firm* — Boyle Fredrickson, S.C.

(57) ABSTRACT

The present disclosure discloses a traffic control method and device. According to the technical scheme, the method includes: allocating a queue respectively for a plurality of service types of data packets, and determining a priority of each queue; after data packets are received, identifying the service types of the data packets, and distributing the data packets to corresponding queues according to the identification result; and dequeuing the data packets in each queue according to the priority in each scheduling cycle.

13 Claims, 1 Drawing Sheet

(56) References Cited

U.S. PATENT DOCUMENTS

| | | | | |
|---|---|---|---|---|
| 2011/0320555 | A1* | 12/2011 | Qiu | H04L 63/08 |
| | | | | 709/207 |
| 2012/0215911 | A1* | 8/2012 | Raleigh | H04L 12/14 |
| | | | | 709/224 |
| 2012/0327948 | A1* | 12/2012 | Mohandoss | H04L 47/21 |
| | | | | 370/412 |
| 2015/0163148 | A1* | 6/2015 | Harmatos | H04L 47/6215 |
| | | | | 370/235 |
| 2015/0180791 | A1* | 6/2015 | Bentley | H04L 47/17 |
| | | | | 370/235 |

* cited by examiner

TRAFFIC CONTROL METHOD, DEVICE AND STORAGE MEDIUM

CROSS-REFERENCES TO RELATED APPLICATIONS

This application claims priority to Chinese patent application No. 201410356804.5 filed on Jul. 24, 2014 and titled "TRAFFIC CONTRAL METHOD, DEVICE AND STORAGE MEDIUM", the content of which is incorporated herein by reference in its entirety.

FIELD

The present disclosure relates to the field of network communications, and in particular relates to a traffic control method, device and storage medium.

BACKGROUND

With the grow-up of large-scale storage and distributed system technologies, the types of data transmitted on the Internet no longer merely include texts and images. The multimedia communication technology, which may fuse a plurality of media types such as text, video, audio and image together, is increasingly widely applied in the Internet domain. With the development of Internet technology, numerous novel services have been infiltrated into various mainstream service types, so that some inessential services (such as download, online game and the like) contend with some key services for limited network resources, and the key services may not be efficiently operated. Therefore, a network traffic management method is needed to utilize the limited bandwidth more reasonably, so as to avoid network congestion or a phenomenon that urgent services may not be timely processed.

QOS (quality of service) is a security mechanism realized by network equipment for guaranteeing data traffic, and is generally used for solving the problems of delay and congestion of network data packets. A best effort service model is used under a default condition, but this model may not make any promise to the relevant quality of packet transmission. With continuous introduction of applications such as voice, video, games and the like, users put forward a higher requirement for the quality of transmission service which may be provided by a network, and a method of simply discarding data packets by a router is no longer suitable for the current network environment.

The existing data traffic control method includes the operations of classifying (by a classifier) data packets according to an identifier which is left on the data packets by an application and is used for identifying the application, identifying which application generates the data packets, then marking the class of the data packets in the data packets, and correspondingly conditioning (by a conditioner) the data packets according to the classification marker (marker) in the data packets, thus reducing the rate of outgoing traffic to force the traffic to follow the allocation limitation of a certain bandwidth and then realizing traffic control.

SUMMARY

An embodiment of the present disclosure provides a traffic control method, including:

allocating a queue respectively for a plurality of service types of data packets, and determining a priority of each queue;

after data packets are received, identifying service types of the data packets, and distributing the data packets to corresponding queues according to the identification result;

dequeuing the data packets in each queue according to the priority in each scheduling cycle.

Another embodiment of the disclosure provides a traffic control device, including:

a memory; and one or more processors, wherein the memory has computer readable program codes stored therein, and the one or more processors are configured to execute the computer readable program codes to perform:

allocating a queue respectively for a plurality of service types of data packets, and determining a priority of each queue;

after data packets are received, identifying the service types of the data packets, and distributing the data packets to corresponding queues according to the identification result;

dequeuing the data packets in each queue according to the priority in each scheduling cycle.

Another embodiment of the present disclosure further provides a storage medium storing computer-readable program codes, wherein the computer-readable program codes are executed by one or more processors to perform:

allocating a queue respectively for a plurality of service types of data packets, and determining a priority of each queue;

after data packets are received, identifying service types of the data packets, and distributing the data packets to corresponding queues according to the identification result;

dequeuing the data packets in each queue according to the priority in each scheduling cycle.

DETAILED DESCRIPTION OF THE EMBODIMENTS

Figure 1:
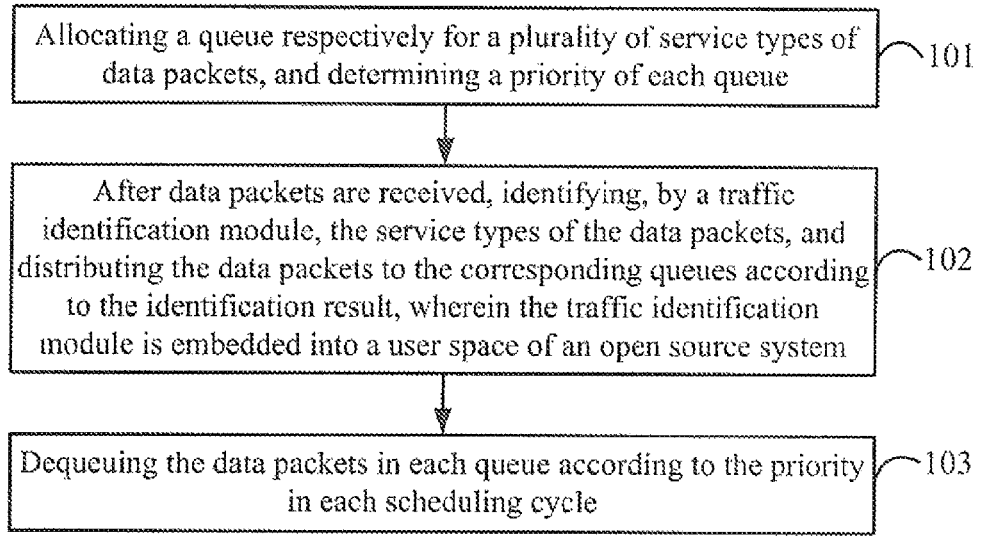
FIG. 1 is a flow diagram of a traffic control method according to an embodiment of the present disclosure.

An embodiment of the present disclosure provides a traffic control method. After data packets are received, a traffic identification module embedded into a user space of an open source system identifies the service types of the data packets, determines corresponding queues according to the service types of the data packets and allocates the data packets to the determined queues, wherein each service type corresponds to a queue, and each queue is provided with a corresponding priority; and the data packets in each queue are dequeued according to the priority of the queue in each scheduling cycle. By adopting the method, control traffic of traffic identification based on an upper-layer application is realized, thus improving the processing efficiency and reducing the implementation complexity.

In the embodiment of the present disclosure, the traffic identification module is embedded into the user space of the open source system (e.g. an OpenWrt system), so that the traffic identification may be implemented on the basis of the upper-layer disclosure.

The architecture of the open source system will be described below by taking OpenWrt system as an example.

OpenWrt is a highly-modularized and highly-automated embedded operating system (LINUX), owns strong network components and extensibility, and is often used in industrial control equipment, phones, small-sized robots, smart homes, routers and VOIP (Voice Over Internet Phone) equipment. OpenWrt is an embedded operating system (LINUX), is open-source and is widely applied to a router system.

The network architecture of operating system (LINUX) may be divided into three layers from top to bottom, including an application layer in a user space, and a network protocol stack layer and a physical hardware layer in a kernel space.

The user space of the OpenWrt system stores codes and data of user programs, and all application programs may directly access the user space. The kernel space of the OpenWrt system stores kernel codes and data, all the application programs may not directly access the kernel space, and the kernel space must be accessed through system operation by converting the application programs to a kernel mode. Therefore, the traffic identification module is embedded into the user space of the OpenWrt system in the embodiment of the present disclosure, the traffic identification module is a software module in the application layer of the user space of the OpenWrt system, in this way, the network traffic may be directly identified through the traffic identification module, and the identification result is sent to the kernel, so that compared with the prior art, the network traffic does not need to be classified and marked in the operating system (LINUX) kernel, and thus the processing efficiency is improved.

In the embodiment of the present disclosure, when network equipment is initialized, corresponding queues may be set according to the service types to which the services, processed by the network equipment, belong. One service type corresponds to one queue for caching data packets of this service type. Further, a queue may also be set for caching data packets of which the service type may not be identified. The queues may adopt a first in first out mechanism. The service types may include but not limited to instant messaging video, VOD (Video on Demand), online game and wireless screen mirroring. The wireless screen mirroring refers to that a PC (Personal Computer) uses a television as a second display through a home network between the PC and the television, so that the multimedia are displayed on the same screen of the PC and the television.

In the embodiment of the present disclosure, a tc command may be configured in a routing login interface to adjust the priority sequence, so as to control the traffic of an application. For example, a new policy object ti_qdisc_ops is registered on a network card, root qdisc is configured as ti_fast (the priority sequence of queues) through the tc command. When the network card is started and after network card equipment calls re=q→enqueue (skb,q) through dev_queue_xmit, then an enqueue function corresponding to ti_qdisc is called for enqueuing operation; and the priority of each queue is preset, e.g. the initialization operation ti_fast_init( ) mainly includes setup of five queues (0, 1, 2, 3, 4), and the priorities of the five queues from high to low correspond to QQ video, online game, VOD, wireless screen mirroring and non-identifiable data packets respectively. In the ti_enqueue( ) operation, the corresponding service types instant messaging video, online game, VOD, wireless screen mirroring and non-identifiable data packets) of data packets are determined according to the received identification result, and then the data packets are placed in the corresponding queues.

In the embodiment of the present disclosure, each above-mentioned queue is also provided with a priority. The priority of each queue is determined according to the bandwidth allocated to the service type corresponding to the queue, wherein the priority of a queue corresponding to a service with large bandwidth is higher than that of a queue corresponding to a service with small bandwidth. For example, taking the service types including instant messaging video, VOD, online game and wireless screen mirroring as an example, the bandwidth required by the current online game is largest in the four, and the bandwidth required by the VOD is smallest in the four, then the priority of the queue corresponding to the online game is highest in all the queues, and the priority of the queue corresponding to the VOD is lowest in all the queues. Alternatively, the priority of the queue for caching the data packets of which the service type is not identified may be set to be lowest, of course, may be set as other priority according to needs. Setting of queues and priority setting of the queues may be adjusted according to needs. For example, when a new type of service is configured on the network equipment, a queue and a queue priority may be set for the new type of service; and when the bandwidth of a service is adjusted, the priority of the queue corresponding to the service may be correspondingly adjusted.

Preferred embodiments of the present disclosure will be described below in combination with the accompanying drawings of the specification. It should be understood that, the preferred embodiments described herein are merely used for illustrating and interpreting the present disclosure, rather than limiting the present disclosure. The embodiments in the present disclosure and features in the embodiments may be combined with each other without conflicts.

Embodiment I

As shown in FIG. 1, an embodiment of the present disclosure provides a traffic control method, including the following operations:

Operation 101, allocating a queue for each service type of data packets, and determining the priority of each queue;

Operation 102, after data packets are received, identifying, by a traffic identification module, service types of the data packets, and distributing the data packets to corresponding queues according to the identification result, wherein the traffic identification module is embedded into a user space of an open source system;

Operation 103, dequeuing the data packets in each queue according to the priority in each scheduling cycle.

The above flow may be implemented by network equipment. The network equipment in the embodiment of the present disclosure may be a router, a gateway or other equipment capable of realizing a network traffic control function.

In operation 101, the priority of each queue may be set according to the service type of a service which may be processed by the network equipment when the network equipment is initialized, wherein one service type corresponds to one queue for caching data packets of this service type. The queues may adopt a first in first out mechanism. A tc command may be configured in a routing login interface to adjust the priority sequence, so as to control the traffic of an application.

In operation 102, the traffic identification module identifies the service types of the data packets and distributes the data packets to the corresponding queues according to the identification result, wherein the traffic identification module needs to have a capability of identifying the service types of the currently received data packets.

Optionally, the identifying the service types of the data packets may include:

identifying the service types of the data packets according to quintuples of the data packets, wherein the information of the quintuple includes source IP address, source port, destination IP address, destination port and communication protocol type;

if the service types of the data packets are not identified according to the quintuples of the data packets, identifying the service types of the data packets according to feature values included in the headers of the data packets; wherein, if the network equipment intercepts port information of the headers of the data packets, the network equipment may check whether certain fixed port numbers are applied in the link record, if so, the corresponding service types of the network data packets may be directly identified.

If the service types of the data packets are not identified according to the feature values included in the headers of the data packets, the service types of the data packets are identified by using a neural network;

if the service types of the data packets are not identified by using the neural network, the data packets are determined as the ones of which the service type is unknown.

An example of identifying the service types of data packets according to the quintuples of the data packets is as follows: if the quintuple information of a data packet includes source IP address 192.168.1.1, source port number 10000, protocol type TCP (Transmission Control Protocol), destination IP address 121.14.88.76 and destination port number 80, since the port number 80 in an HTTP (Hype Text Transport Protocol) in a TCP protocol cluster identifies a web browsing service, the service type of such data packet may be identified as web browsing according to the quintuple information.

As mentioned above, if the service types of the data packets are not identified according to the quintuples of the data packets, the service types of the data packets may be identified according to the feature values included in the headers of the data packets.

For example, the header of a data packet generally includes a port number. The port number is an identification number of application software with a network function. However, the port number is not fixed and may be manually allocated by a user. Of course, many pieces of application software have acknowledged port numbers, e.g. FTP: 20 and 21, HTTP: 80, TELNET: 23 and so on. A piece of software may own a plurality of port numbers, which proves that the software owns more than one network function. 0-1023 are acknowledged port numbers, that is, have been commonly defined or are reserved for software to be commonly defined, whereas 1024-65535 are port numbers which are not commonly defined, and the functions of these ports may be defined by a user. An identification method based on fixed ports mainly depends on a port mapping table specified by the Internet Assigned Numbers Authority (IANA), e.g. the port number of HTTP is 80, the port number of SMTP is 25, the port number of TELENT is 23 and so on.

As mentioned above, if the service types of the data packets are not identified according to the feature values included in the headers of the data packets, the data packets are determined as the ones of which the service type is unknown.

Further, if the service types of the data packets are not identified according to the feature values included in the headers of the data packets, the service types of the data packets may be identified by using the neural network. Algorithms of the neural network for data packet identification at present include a traffic identification method based on a BP (Back Propagation) neural network, an SVM (Support Vector Machine), a CFS (Correlation based Feature Selection), etc. the embodiment of the present disclosure adopts the BP neural network algorithm for identifying the service types of the data packets. The embodiment of the present disclosure does not limit to the neural network algorithm for identifying the service types of the data packets.

Further, if the service types of the data packets are not identified by using the neural network, the data packets are determined as the ones of which the service type is unknown, and the data packets are distributed to the queue for storing the data packets of which the service type is unknown.

In this embodiment, the traffic identification module is used as a software packet embedded into the OpenWrt system, and the traffic identification module captures a data packet for analyzing, extracts the quintuple information of the data packet for identifying, then identifies the fixed feature value of the header of the data packet. When the data packet may not be identified by using the quintuple information and the feature value, the traffic identification module counts the traffic according to a machine learning method of the neural network, and extracts a feature for identifying. Different identification methods have different advantages, and the above three combined identification methods are adopted in this embodiment, so that the processing efficiency of network traffic identification is improved.

In operation 103, the data packets in each queue are dequeued according to the priority in each scheduling cycle.

The data packet scheduling cycle of the network equipment is very fast. In each data packet scheduling cycle, the network equipment determines the ratio of the data packets to be dequeued in respective queues in the current scheduling cycle according to the priorities of the queues corresponding to all the service types, and dequeues the data packets in each queue according to the ratio of the data packets to be dequeued in respective queues by polling all the queues. The number of the corresponding data packets to be dequeued in the queue with a higher priority is larger than that in the queue with a lower priority.

Specifically, besides the queues corresponding to the service types, the queue for storing data packets of which the service type is unknown is also set, and the network equipment may dequeue the data packets in each queue according to the priorities of the queues corresponding to all the service types and the priority of the queue for storing the data packets of which the service type is unknown.

For example, there are four queues, respectively queue A, queue B, queue C and queue D, wherein the priorities of the four queues are queue A>queue B>queue C=queue D, and when the data packets in the four queues are dequeued, the number of the dequeued data packets in the queue A is larger than that of the dequeued data packets in the queue B, the number of the dequeued data packets in the queue B is larger than that of the dequeued data packets in the queue C, and the number of the dequeued data packets in the queue C is equal to that of the dequeued data packets in the queue D.

For another example, if the priorities of the above-mentioned four queues are queue A>queue B>queue C>queue D, and when the data packets in the four queues are dequeued, the number of the dequeued data packets in the queue A is larger than that of the dequeued data packets in the queue B, the number of the dequeued data packets in the queue B is larger than that of the dequeued data packets in the queue C, and the number of the dequeued data packets in the queue C is larger than that of the dequeued data packets in the queue D.

In the above-mentioned embodiment, because the priority of the queue D is lowest, the data packets in the queue D may be dequeued only after the data packets of the queue A, the queue B and the queue C are dequeued completely. In implementation, when the number of the dequeued data packets in some queues with higher priorities is relatively large, the data packets in the queues with lower priorities may not be normally dequeued all the time, so that the data packets in the queues with lower priorities may not be responded. In order to avoid such situation, dequeuing may be carried out by polling the data packets in all the queues.

For example, there are five queues, respectively queue $A_1$, queue $B_1$, queue $C_1$, queue $D_1$ and queue $E_1$, the priorities of the queues are sequentially decreased and are respectively 5, 4, 3, 2 and 1, and the ratio of the numbers of the data packets to be dequeued in the queues may be determined as 5:4:3:2:1 according to the priorities of the queues. At most 150 data packets may be scheduled in a scheduling cycle, and it could be obtained according to the ratio of the numbers of the data packets to be dequeued in the queues that the number of the data packets to be dequeued in the queue $A_1$ is 50, the number of the data packets to be dequeued in the queue $B_1$ is 40, the number of the data packets to be dequeued in the queue $C_1$ is 30, the number of the data packets to be dequeued in the queue $D_1$ is 20 and the number of the data packets to be dequeued in the queue E is 10. During dequeuing, the queue $A_1$, the queue $B_1$, the queue $C_1$, the queue $D_1$ and the queue $E_1$ are sequentially polled, and when some queue is polled, one data packet in the polled queue is dequeued. When the number of the dequeued data packets in one queue has reached the number to be dequeued in the current scheduling cycle, the queue no longer participates in polling. By adopting the method, the problem that the queue with relatively low priority may not be normally dequeued all the time may be solved.

It could be seen from the above embodiment, after the data packets are received, the service types of the data packets are identified through the traffic identification module embedded into the user space of the open source system, the queues corresponding to the data packets are determined according to the service types of the data packets, and the data packets are distributed to the determined queues; wherein, each service type corresponds to a queue, and each queue is set with a corresponding priority; and the data packets in each queue are dequeued according to the priorities of the queues in each scheduling cycle. By adopting the method, traffic control of traffic identification based on an upper-layer application is realized, the processing efficiency is improved, and the implementation complexity is reduced.

Based on the same technical conception, the embodiments of the present disclosure further provide a traffic control device, and for the specific contents of the device, reference may be made to the implementation of the above-mentioned method, which will not be redundantly described herein.

Figure 2:
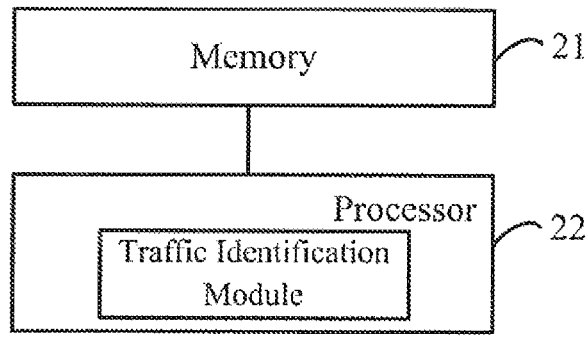
FIG. 2 is a schematic diagram of a traffic control device according to another embodiment of the present disclosure.

FIG. 2 shows a structural diagram of a traffic control device provided by another embodiment of the present disclosure. The device includes: a memory 21; and one or more processors 22, wherein the memory has computer readable program codes stored therein, and the one or more processors are configured to execute the computer readable program codes to perform: allocating a queue respectively for a plurality of service types of data packets, and determining a priority of each queue;

after data packets are received, identifying the service types of the data packets, and distributing the data packets to corresponding queues according to the identification result;

dequeuing the data packets in each queue according to the priority in each scheduling cycle.

Optionally, the processors further execute the computer readable program codes to implement a traffic identification module, which is embedded into a user space of an open source system and configured to identify the service types of the data packets.

Optionally, the allocating further includes: allocating a queue for data packets of which the service type is unknown, then the distributing the data packets to the corresponding queues according to the identification result further includes: if the service types of the data packets are not identified, distributing the data packets to the queue for storing the data packets of which the service type is unknown.

Optionally, the identifying the service types of the data packets includes:

identifying the service types of the data packets according to quintuples of the data packets;

if the service types of the data packets are not identified according to the quintuples of the data packets, identifying the service types of the data packets according to feature values included in the headers of the data packets;

if the service types of the data packets are not identified according to the feature values included in the headers of the data packets, determining the data packets as the ones of which the service type is unknown.

Optionally, the identifying the service types of the data packets includes:

identifying the service types of the data packets according to quintuples of the data packets;

if the service types of the data packets are not identified according to the quintuples of the data packets, identifying the service types of the data packets according to feature values included in the headers of the data packets;

if the service types of the data packets are not identified according to the feature values included in the headers of the data packets, identifying the service types of the data packets by using a neural network;

if the service types of the data packets are not identified by using the neural network, determining the data packets as the ones of which the service type is unknown.

Optionally, the dequeuing the data packets in each queue according to the priority includes:

determining the ratio of the data packets to be dequeued in respective queues in a current scheduling cycle according to the priorities of the queues; wherein, the number of the data packets to be dequeued in the queue with a higher priority is larger than that in the queue with a lower priority;

dequeuing the data packets in each queue by polling all the queues according to the ratio of the data packets to be dequeued in respective queues.

Optionally, the determining the priority of each queue includes:

determining the priority of each corresponding queue according to bandwidth allocated to each service type, wherein the priority of a queue corresponding to a service type allocated with large bandwidth is higher than that of a queue corresponding to a service type allocated with small bandwidth.

Optionally, the traffic identification module is a software module in an application layer of the user space of the open source system, and the open source system is an operating system (LINUX).

In this embodiment, the traffic identification module is configured to identify the service types of the data packets, determine the corresponding queues according to the identification result and distribute the data packets to the determined queues; wherein, the traffic identification module is embedded into the user space of the open source system, each service type corresponds to a queue, and each queue is set with a corresponding priority; and a control module is configured to dequeue the data, packets in each queue according to the priorities of the queues in each scheduling cycle. By adopting the method, traffic control of traffic identification based on upper-layer application is realized, the processing efficiency is improved, and the implementation complexity is reduced.

The functions implemented by the traffic control device provided by this embodiment are in one-to-one correspondence to the flows of the traffic control method provided by the above-mentioned embodiment. The more detailed processing flows implemented by the device are described in detail in the above-mentioned, method embodiment I, and are not redundantly described herein.

Moreover, the embodiment of the present disclosure further provides a computer-readable storage medium, which may be the one included in the memory in the above-mentioned embodiment or the one which separately exists and is not assembled into a terminal. The computer-readable storage medium stores one or more programs (in certain embodiments, the computer-readable storage medium may be one or more disk memories, flash memories, or other non-volatile solid state memories, CD-ROMs, optical memories and the like), and the one or more programs may be executed by the one or more processors to perform the traffic control method described in any above-mentioned embodiment.

According to the traffic control method provided by the embodiment of the present disclosure, after the data packets are received, the service types of the received data packets are identified through the traffic identification module embedded into the user space of the open source system, the corresponding queues are determined according to the service types of the data packets, the data packets are distributed to the determined queues, and the data packets in each queue are dequeued according to the priority of the queue in each scheduling cycle. In the embodiments of the present disclosure, the traffic identification is carried out on the basis of the traffic identification module embedded into the user space of the open source system, that is, the traffic identification is carried out on the basis of the application layer; since all applications may access the application layer, the traffic identification module may directly identify the traffic of various applications; the traffic identification is carried out in the kernel in the prior art, and the applications may not directly access the kernel and need to be processed in a kernel mode, so in comparison, the traffic identification processing efficiency may be improved in the embodiments of the present disclosure; in addition, different queues stores different service types of data packets, and the data packets are dequeued on the basis of the priorities of the queues, so that classification markers do not need to be recorded in the data packets, and compared with the prior art, the amount of data to be processed is reduced, and the traffic identification processing efficiency is improved similarly.

Obviously, various modifications and variations could be made to the present disclosure by those skilled in the art without departing from the spirit and scope of the present disclosure. Thus, provided that these modifications and variations made to the present disclosure are within the scope of the claims of the present disclosure and equivalent technologies thereof, the present disclosure is intended to cover these modifications and variations.

The invention claimed is:

1. A traffic control method, applied to network equipment, comprising:
   receiving data packets;
   identifying, by a traffic identification module in an application layer, service types of the data packets according to at least one element in each of quintuples of the data packets, wherein each of the quintuples comprises the following elements: source IP address, source port number, destination IP address, destination port number, and protocol type;
   distributing the data packets to corresponding queues according to the service types of the data packets, each of the queues has a corresponding priority and corresponds to each of the service types, and the priority of the queue corresponding to the service type allocated with large bandwidth is higher than that of the queue corresponding to the service type allocated with small bandwidth; and
   determining a ratio of the data packets to be dequeued in each queue in each scheduling cycle according to the priority of each queue, dequeuing the data packets in each queue by polling all the queues according to the ratio of the data packets to be dequeued in each queue, wherein the number of the data packets dequeued in the queue with a higher priority is larger than the number of the data packets dequeued in the queue with a lower priority in each scheduling cycle.

2. The method according to claim 1, wherein the traffic identification module is embedded into a user space of an open source system.

3. The method according to claim 1, wherein,
   the allocating further comprises: allocating a queue for data packets of which the service type is unknown, then
   the distributing the data packets to the corresponding queues according to the identification result further comprises: when the service types of the data packets are not identified, distributing the data packets to the queue for storing the data packets of which the service type is unknown.

4. The method according to claim 3, wherein the identifying the service types of the data packets comprises:
   identifying the service types of the data packets according to quintuples of the data packets;
   when the service types of the data packets are not identified according to the quintuples of the data packets, identifying the service types of the data packets according to feature values comprised in headers of the data packets;
   when the service types of the data packets are not identified according to the feature values comprised in the headers of the data packets, determining the data packets as the ones of which the service type is unknown.

5. The method according to claim 3, wherein the identifying the service types of the data packets comprises:

identifying the service types of the data packets according to quintuples of the data packets;

when the service types of the data packets are not identified according to the quintuples of the data packets, identifying the service types of the data packets according to feature values comprised in headers of the data packets;

when the service types of the data packets are not identified according to the feature values comprised in the headers of the data packets, identifying the service types of the data packets by using a neural network;

when the service types of the data packets are not identified by using the neural network, determining the data packets as the ones of which the service type is unknown.

6. The method according to claim 2, wherein the traffic identification module is a software module in an application layer of the user space of the open source system, and the open source system is an operating system (LINUX).

7. A traffic control device, comprising:
a memory; and
one or more processors,
wherein the memory has computer readable program codes stored therein, and the one or more processors are configured to execute the computer readable program codes to perform:
receiving data packets;
identifying, by a traffic identification module in an application layer, service types of the data packets according to at least one element in each of quintuples of the data packets, wherein each of the quintuples comprises the following elements: source IP address, source port number, destination IP address, destination port number, and protocol type;
distributing the data packets to corresponding queues according to the service types of the data packets, each of the queues has a corresponding priority and corresponds to each of the service types, and the priority of the queue corresponding to the service type allocated with large bandwidth is higher than that of the queue corresponding to the service type allocated with small bandwidth; and
determining a ratio of the data pockets to be dequeued in each queue in each scheduling cycle according to the priority of each queue, dequeuing the data packets in each queue by polling all the queues according to the ratio of the data packets to be dequeued in each queue, wherein the number of the data packets dequeued in the queue with a higher priority is larger than the number of the data packets dequeued in the queue with a lower priority in each scheduling cycle.

8. The device according to claim 7, wherein the traffic identification module is embedded into a user space of an open source system.

9. The device according to claim 7, wherein,
the allocating further comprises: allocating a queue for data packets of which the service type is unknown, then
the distributing the data packets to the corresponding queues according to the identification result further comprises: when the service types of the data packets are not identified, distributing the data packets to the queue for storing the data packets of which the service type is unknown.

10. The device according to claim 9, wherein the identifying the service types of the data packets comprises:
identifying the service types of the data packets according to quintuples of the data packets;
when the service types of the data packets are not identified according to the quintuples of the data packets, identifying the service types of the data packets according to feature values comprised in headers of the data packets;
when the service types of the data packets are not identified according to the feature values comprised in the headers of the data packets, determining the data packets as the ones of which the service type is unknown.

11. The device according to claim 9, wherein the identifying the service types of the data packets comprises:
identifying the service types of the data packets according to quintuples of the data packets;
when the service types of the data packets are not identified according to the quintuples of the data packets, identifying the service types of the data packets according to feature values comprised in headers of the data packets;
when the service types of the data packets are not identified according to the feature values comprised in the headers of the data packets, identifying the service types of the data packets by using a neural network;
when the service types of the data packets are not identified by using the neural network, determining the data packets as the ones of which the service type is unknown.

12. The device according to claim 8, wherein the traffic identification module is a software module in an application layer of the user space of the open source system, and the open source system is an operating system (LINUX).

13. A non-transitory storage medium storing computer-readable program codes, wherein the computer-readable program codes are executed by one or more processors to perform:
receiving data packets;
identifying, by a traffic identification module in an application layer, service types of the data packets according to at least one element in each of quintuples of the data packets, wherein each of the quintuples comprises the following elements: source IP address, source port number, destination IP address, destination port number, and protocol type;
distributing the data packets to corresponding queues according to the service types of the data packets, each of the queues has a corresponding priority and corresponds to each of the service types, and the priority of the queue corresponding to the service type allocated with large bandwidth is higher than that of the queue corresponding to the service type allocated with small bandwidth; and
determining a ratio of the data packets to be dequeued in each queue in each scheduling cycle according to the priority of each queue, dequeuing the data packets in each queue by polling all the queues according to the ratio of the data packets to be dequeued in each queue, wherein the number of the data packets dequeued in the queue with a higher priority is larger than the number of the data packets dequeued in the queue with a lower priority in each scheduling cycle.

\* \* \* \* \*